US012443481B2

(12) United States Patent
Ivanov (10) Patent No.: US 12,443,481 B2
(45) Date of Patent: Oct. 14, 2025

(54) IMAGE SENSOR BASED COUNTERMEASURES FOR IMPROVING ELECTRONIC SYSTEM INTEGRITY

(71) Applicant: Harman Becker Automotive Systems GmbH, Karlsbad-Ittersbach (DE)

(72) Inventor: Ivan Iliev Ivanov, Bayern (DE)

(73) Assignee: HARMAN BECKER AUTOMOTIVE SYSTEMS GMBH, Karlsbad-Ittersbach (DE)

(*) Notice: Subject to any disclaimer, the term of this patent is extended or adjusted under 35 U.S.C. 154(b) by 22 days.

(21) Appl. No.: 18/615,799

(22) Filed: Mar. 25, 2024

(65) Prior Publication Data

US 2025/0298690 A1    Sep. 25, 2025

(51) Int. Cl.
*G06F 11/00* (2006.01)
*G06F 11/07* (2006.01)
*H04N 23/55* (2023.01)

(52) U.S. Cl.
CPC ...... *G06F 11/0796* (2013.01); *G06F 11/0793* (2013.01); *H04N 23/55* (2023.01)

(58) Field of Classification Search
CPC .. G06F 11/0793; G06F 11/0796; H04N 23/55
See application file for complete search history.

(56) References Cited

U.S. PATENT DOCUMENTS

| | | | |
|---|---|---|---|
| 2020/0204794 A1 | 6/2020 | Chua et al. | |
| 2021/0295560 A1* | 9/2021 | Dworakowski | H04N 23/52 |
| 2023/0053042 A1* | 2/2023 | Hung | G06F 9/3004 |
| 2024/0089639 A1 | 3/2024 | Zuo et al. | |
| 2024/0132058 A1* | 4/2024 | Sugiyama | H04L 12/28 |
| 2024/0232050 A1* | 7/2024 | Nair | G06F 11/3644 |
| 2024/0296702 A1* | 9/2024 | Aneja | G06F 11/0751 |

FOREIGN PATENT DOCUMENTS

JP    2001128068 A    5/2001

OTHER PUBLICATIONS

Chen, Y. et al., "Online Image Sensor Fault Detection for Autonomous Vehicles," Proceedings of the 2022 IEEE 15th International Symposium On Embedded Multicore/Many-Core Systems-On-Chip, Dec. 19, 2022, Penang, Malaysia, 29 pages.
European Patent Office, Extended European Search Report Issued in Application No. 25156914.1, Jul. 14, 2025, Germany, 12 pages.

* cited by examiner

*Primary Examiner* — Joshua P Lottich
(74) *Attorney, Agent, or Firm* — McCoy Russell LLP (57) ABSTRACT

Disclosed herein are mechanisms and methods for maintaining and/or achieving a target Automotive Safety Integrity Level (ASIL) level for a vehicle. One or more shutters of one or more corresponding image sensors of the vehicle may be repeatedly closed at a predetermined rate. While the shutters are closed, output values of each image sensor may be measured. A soft error rate may be determined for the vehicle based on the measurement of the output values, and one or more system countermeasures sufficient to maintain and/or achieve a target ASIL level based at least on the soft error rate may be implemented.

20 Claims, 7 Drawing Sheets

IMAGE SENSOR BASED COUNTERMEASURES FOR IMPROVING ELECTRONIC SYSTEM INTEGRITY

FIELD

The disclosure relates to improving and/or hardening the robustness of electronic systems, such as vehicular electronic systems, against "soft errors."

BACKGROUND

Electronic systems may include various numbers of electronic components, such as microprocessors, memory components, input components, and/or output components. These components may be integrated at the level of a circuitry board (on a printed circuit board (PCB), for example) and/or integrated within a single silicon device (as parts of a System-on-a-Chip (SoC), for example). Such electronic systems, and their components, may be subject to a variety of failure modes. Meanwhile, some usage models may be disposed to complying with a certain degree of system integrity in view of various potential failure modes. For example, it may be highly desirable for vehicular electronic systems such as Advanced Driver Assistance Systems (ADAS) and/or autonomous systems (e.g., vehicular systems for autonomous driving) to maintain a high degree of integrity in the face of potential failure modes, so that system operation may be maintained in the presence of potential failure modes.

To that end, the International Organization for Standardization (ISO) 26262 standard defines various Automotive Safety Integrity Level (ASIL) classifications, such as (from lowest to highest) ASIL A, ASIL B, ASIL C, and ASIL D. Differences between these ASIL levels may relate to system failure rates and/or system safety.

For a vehicular ADAS system or autonomous system to achieve a target ASIL level, the system should set requirements for its electronic components (such as memory, SoCs, and so on), implement system-level actions working together with its electronic components to achieve the target ASIL level, and comply with ISO 26262 in order to accommodate the defined failure rates of the target ASIL level.

Some approaches to achieving higher-integrity ASIL levels such as ASIL C and/or ASIL D may include the implementation of redundancy, such as dual modular redundancy (DMR) or triple modular redundancy (TMR), in which some portion of the hardware components and/or software components of a system are implemented in duplicate or in triplicate, respectively. Other approaches may include implementing error detection and/or error correction, for example within a memory array, in order to catch and/or recover from memory failures (and thereby accommodate defined failure rates of the target ASIL level).

Implementing error detection and/or error correction capacities sufficient to accommodate defined failure rates of a target ASIL level may in turn involve the use of additional dynamic random access memory (DRAM) components (and/or techniques such as lock step operation). However, DRAM is an expensive system component, so additional DRAM components may be cost prohibitive. Alternatively, it may be conceivable to implement error detection and/or error correction using existing DRAM—but the use of existing DRAM to implement a desired type of error detection and/or error correction (e.g., by running advanced error detection and/or error correction algorithms) may require half of a system's existing DRAM, or more, and existing DRAM is often already fully used by systems in order to achieve performance targets. A system designed to accommodate failures rates of a target ASIL level may include expensive provisions for appropriate error detection and/or error correction (and perhaps DMR and/or TMR).

Meanwhile, although some DRAM failure modes may relate to hardware failures (e.g., due to hardware errors and/or device-specific failures), other DRAM failure modes may relate to "soft errors" which may occur as a result of external factors such as elevated temperature, alpha particle strikes, and/or neutron flux (due to, e.g., cosmic rays) or flux of other high-energy particles. In particular, neutron flux can contribute heavily to soft error rates. (The impact of neutron flux on DRAM and other electronic components is defined in Joint Electron Device Engineering Council (JEDEC) Standard (JESD) 89A.) In order to accommodate a target ASIL level, an electronic system (such as a vehicular electronic system as discussed herein) should accommodate DRAM failures modes related to both hardware failures and soft errors. However, while memory suppliers can provide estimated hardware failure rates (e.g., due to hardware errors and/or device-specific failures), they cannot provide estimated soft error rates.

Conventional neutron ground monitors may be used to measure neutron flux, but in addition to being extremely expensive, such monitors can be very heavy, and most likely cannot fit in any car.

SUMMARY

Disclosed herein are methods and mechanisms for using image sensors in an electronic system to obtain a measurement of neutron flux. With that measurement, soft error rates may be estimated; and the estimates of soft error rates (as well as pre-established estimates of hardware failure rates) may be used to determine countermeasures that the system may take to achieve a target ASIL level (meaning to maintain and/or achieve the target ASIL level), such as by temporarily entering a mode for appropriate error detection and/or error correction (and/or modular redundancy).

In some embodiments, the issues described above may be addressed by methods comprising repeatedly closing shutters of a set of image sensors of an electronic system (e.g., a vehicular electronic system as discussed herein), each image sensor having a plurality of pixels. While the shutters are closed, one or more photodetectors among the plurality of pixels of at least one image sensor may be detected to be excited beyond a predetermined excitation threshold (as determined by, e.g., output value of the photodetector). A soft error rate for the system may be determined based on the detection of the one or more photodetectors excited beyond the predetermined excitation threshold, and one or more system countermeasures may be implemented to compensate for the soft error rate. In this way, vehicular electronic systems (such as ADAS systems and/or autonomous driving systems) may accommodate failure rates sufficient to achieve a target ASIL level (meaning to maintain and/or achieve the target ASIL level) while minimizing the permanent implementation of expensive hardware components and/or software components.

For some embodiments, the issues described above may be addressed by methods of achieving a target ASIL level for a vehicle comprising repeatedly closing shutters of a set of image sensors of the vehicle at a predetermined rate. While the set of shutters are closed, output values of each image sensor may be measured. A soft error rate for the vehicle may be determined based on the measurement of the output values, and one or more system countermeasures sufficient to achieve the target ASIL level may be implemented based at least on the soft error rate. In this way, existing image sensors of a vehicle (e.g., cameras) may be measured with closed shutters to determine a soft error rate, at which point appropriate countermeasures may be implemented based on the soft error rate to achieve a target ASIL level, without system-level implementation of permanent hardware components and/or software components.

In further embodiments, the issues described above may be addressed by systems for implementing soft-error countermeasures for a vehicle, comprising image sensors of the vehicle, each and one or more mechanical shutters corresponding with the one or more image sensors. Each image sensor may have a plurality of pixels. The systems may also have one or more processors and non-transitory memory having executable instructions. When executed, the instructions may cause the one or more processors to repeatedly close the one or more mechanical shutters at a predetermined rate, measure output values for the plurality of pixels of each image sensor, determine as soft error rate for the vehicle based on the measurement of the non-baseline output values, and implement countermeasures to compensate for the soft error rate for the vehicle. The countermeasures may include hardware countermeasures and/or software countermeasures, and may be directed toward error detection and/or error correction. In this way, a set of image sensors (e.g., cameras) of a vehicle may accessed to perform measurements when the shutters are closed, and the outputs of those image sensors may be used to estimate soft error rates in an ongoing way without reliance upon cost-prohibitive hardware and/or software that might otherwise detect soft errors.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIGS. 2-4 show methods of using image sensors in an electronic system to estimate soft error rates and determine countermeasures that the system may take to achieve a target ASIL level, in accordance with one or more embodiments of the present disclosure;

DETAILED DESCRIPTION

Disclosed herein are methods and systems for estimating soft error rates, and thereafter implementing system-level countermeasures to achieve target integrity levels in view of the estimated soft error rates. As discussed herein, neutron flux (e.g., due to cosmic rays) can contribute heavily to soft error rates. In turn, soft error rates may impact the ability of vehicular electronic systems (such as ADAS systems and autonomous driving systems) to achieve a target ASIL level. However, if neutron flux can be estimated, then a vehicular electronic system may implement countermeasures (such as advanced DRAM error detection and/or error correction algorithms) to achieve the target ASIL level even in the presence of the neutron flux.

As automotive technologies develop, vehicles are increasingly equipped with a variety of image sensors, e.g., cameras. In various embodiments, image sensors may include complementary metal oxide semiconductor (CMOS) based sensor devices and/or charge coupled devices (CCD) based sensor devices. Meanwhile, such imaging devices may be sensitive to neutron hits. While such neutron hits may be seen as error conditions and/or as failing modes in the sense that some amount of data corruption may thereby be caused, the associated camera devices may operate to provide evidence of neutron hits, and thereby provide a mechanism for measuring neutron flux.

Figure 1A:
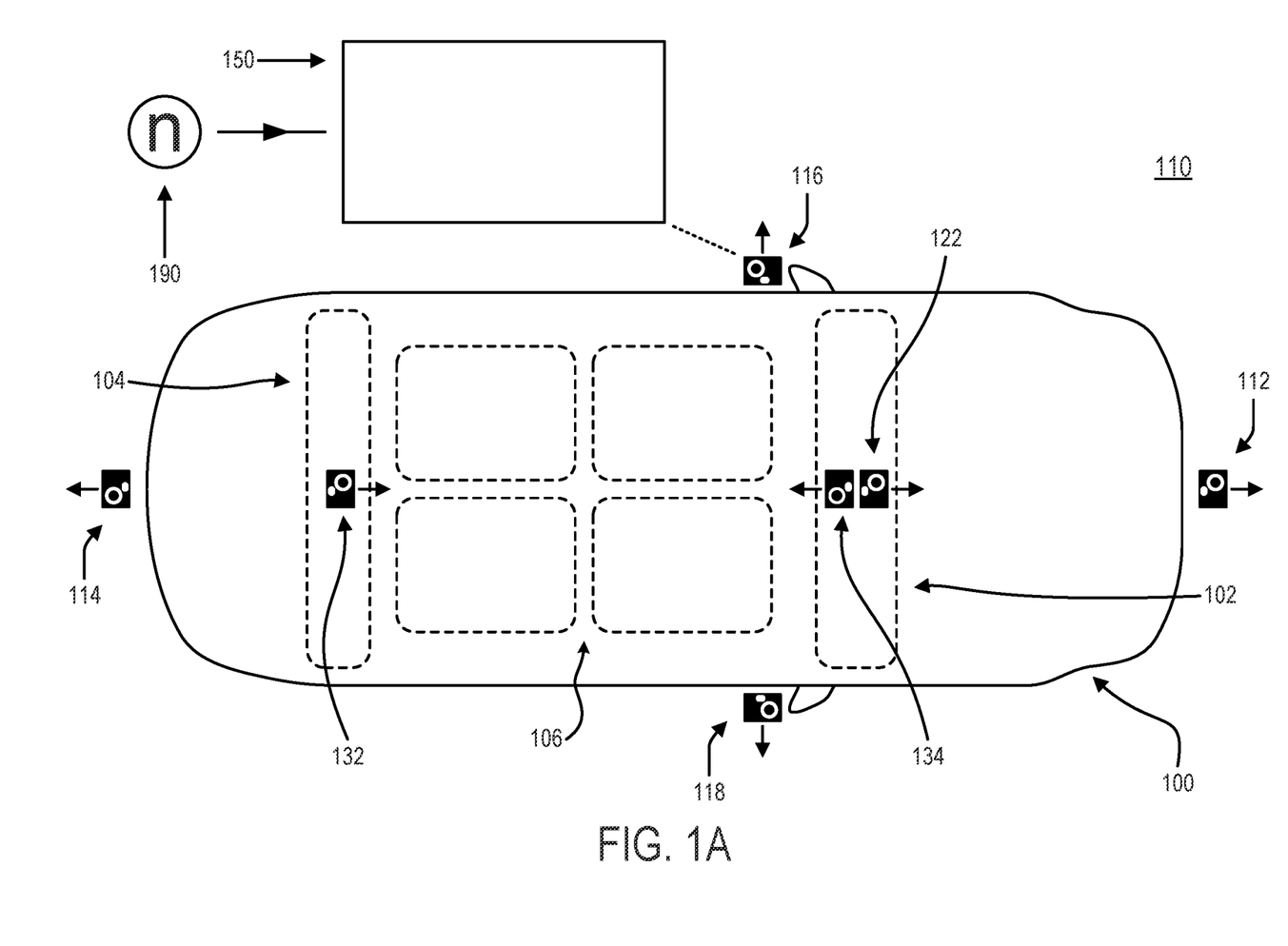
FIGS. 1A and 1B show a vehicle including an electronic system in accordance with one or more embodiments of the present disclosure.
Figure 1B:
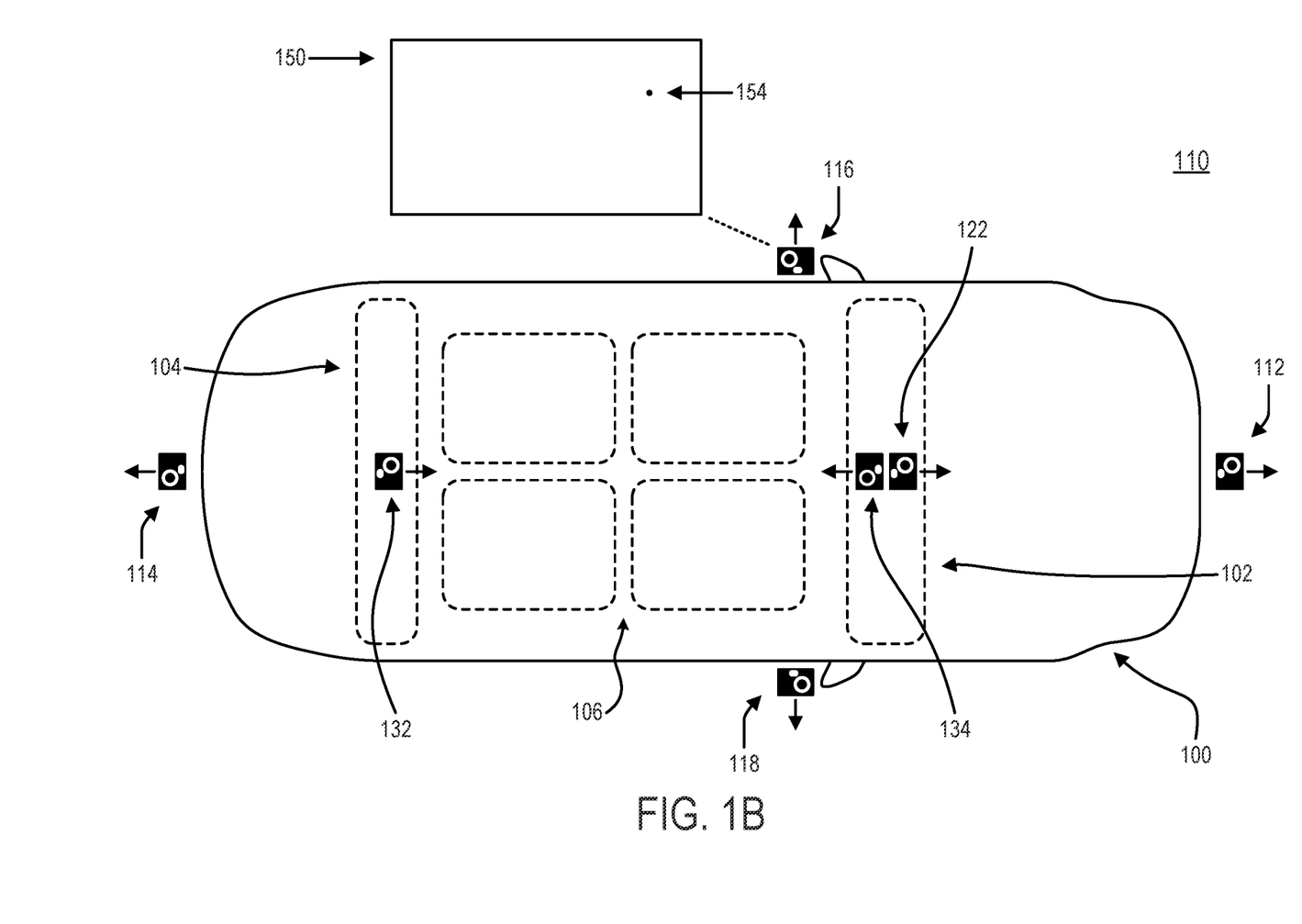
Figure 2:
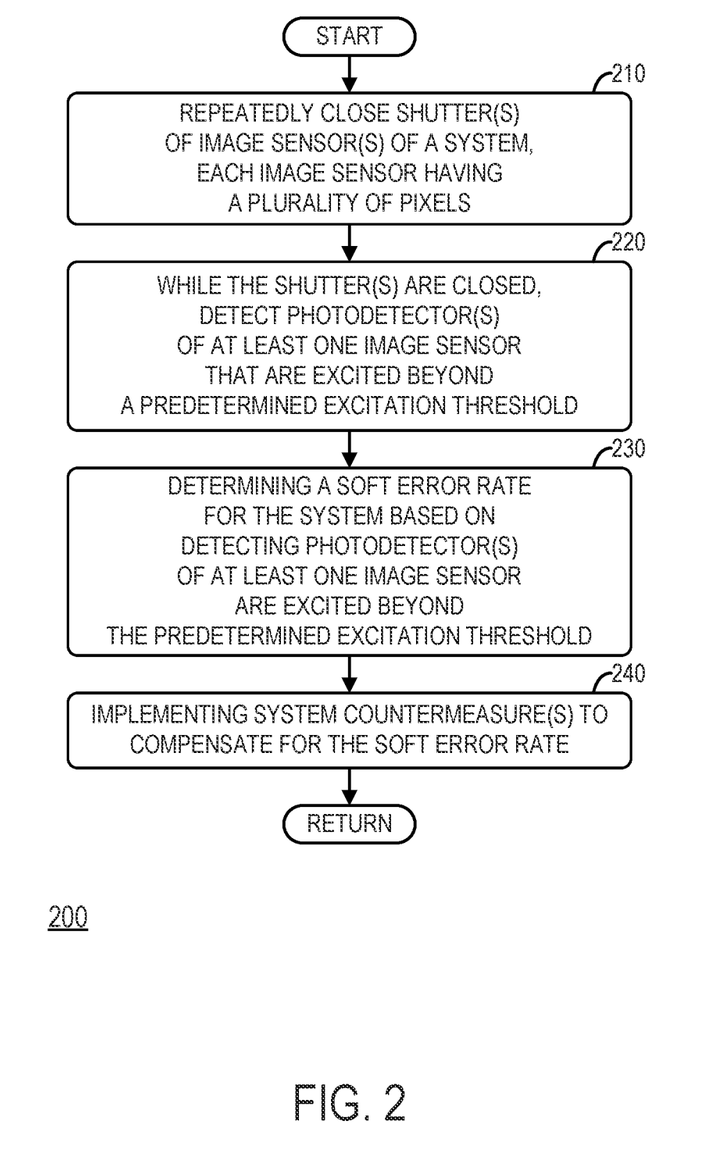
FIGS. 2 and 3 show methods for achieving a target ASIL level for a vehicle in accordance with one or more embodiments of the present disclosure.
Figure 3:
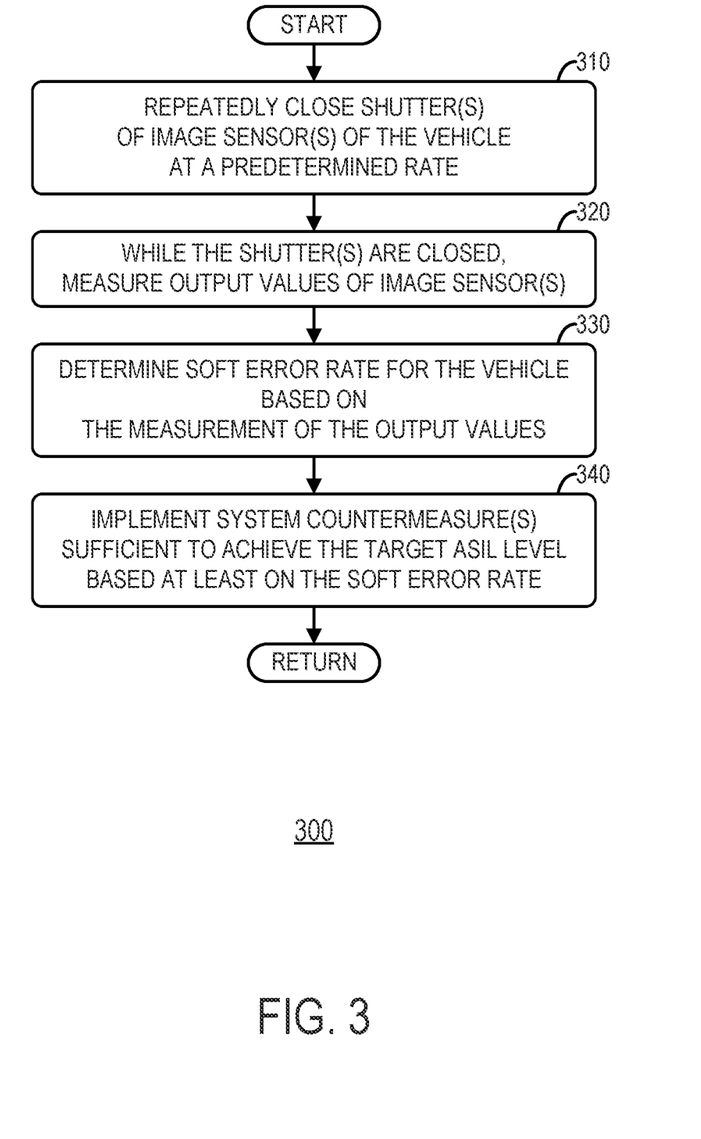
Figure 4:
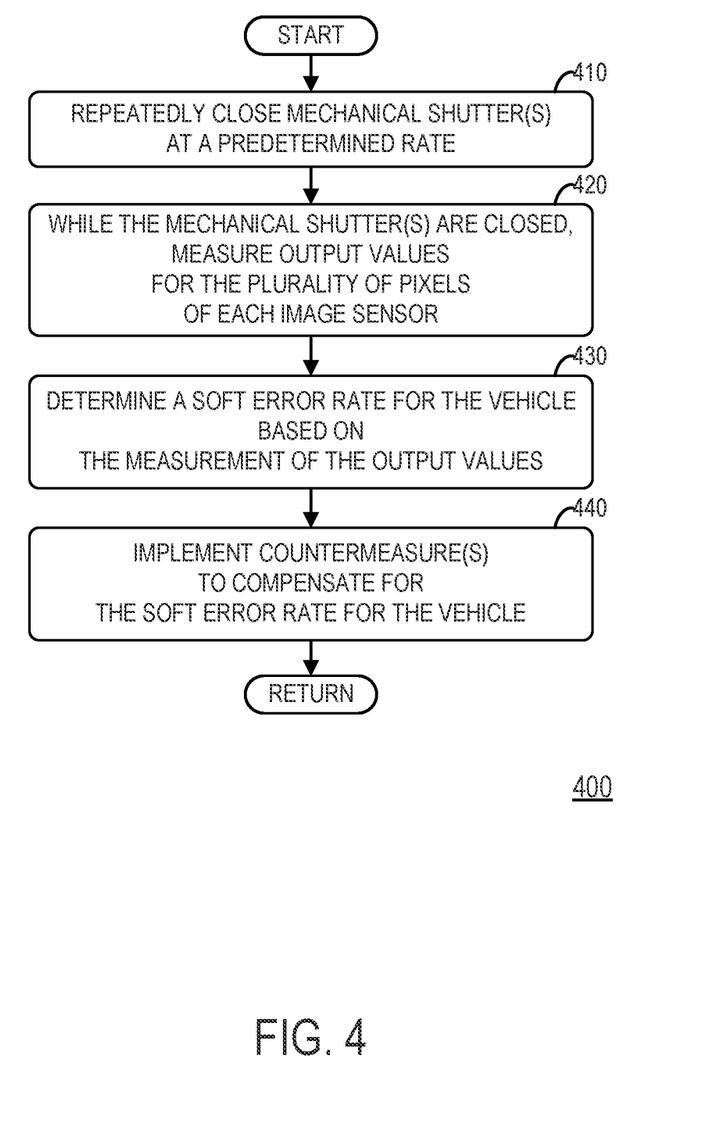
Figure 5:
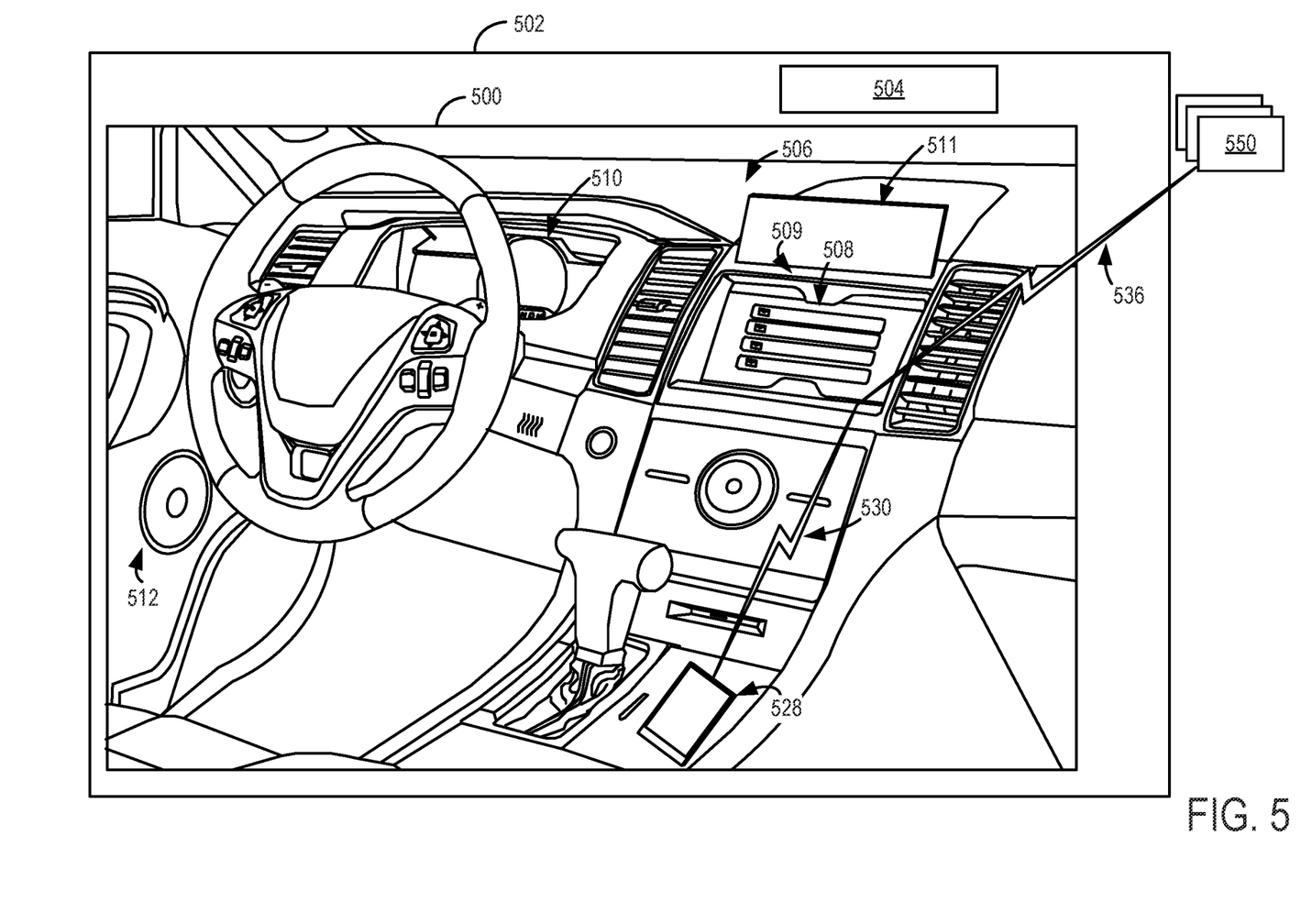
FIG. 5 shows an example partial view of an interior of a cabin of a vehicle with an electronic system for estimating soft error rates and determining countermeasures to achieve a target ASIL level, in accordance with one or more embodiments of the present disclosure.
Figure 6:
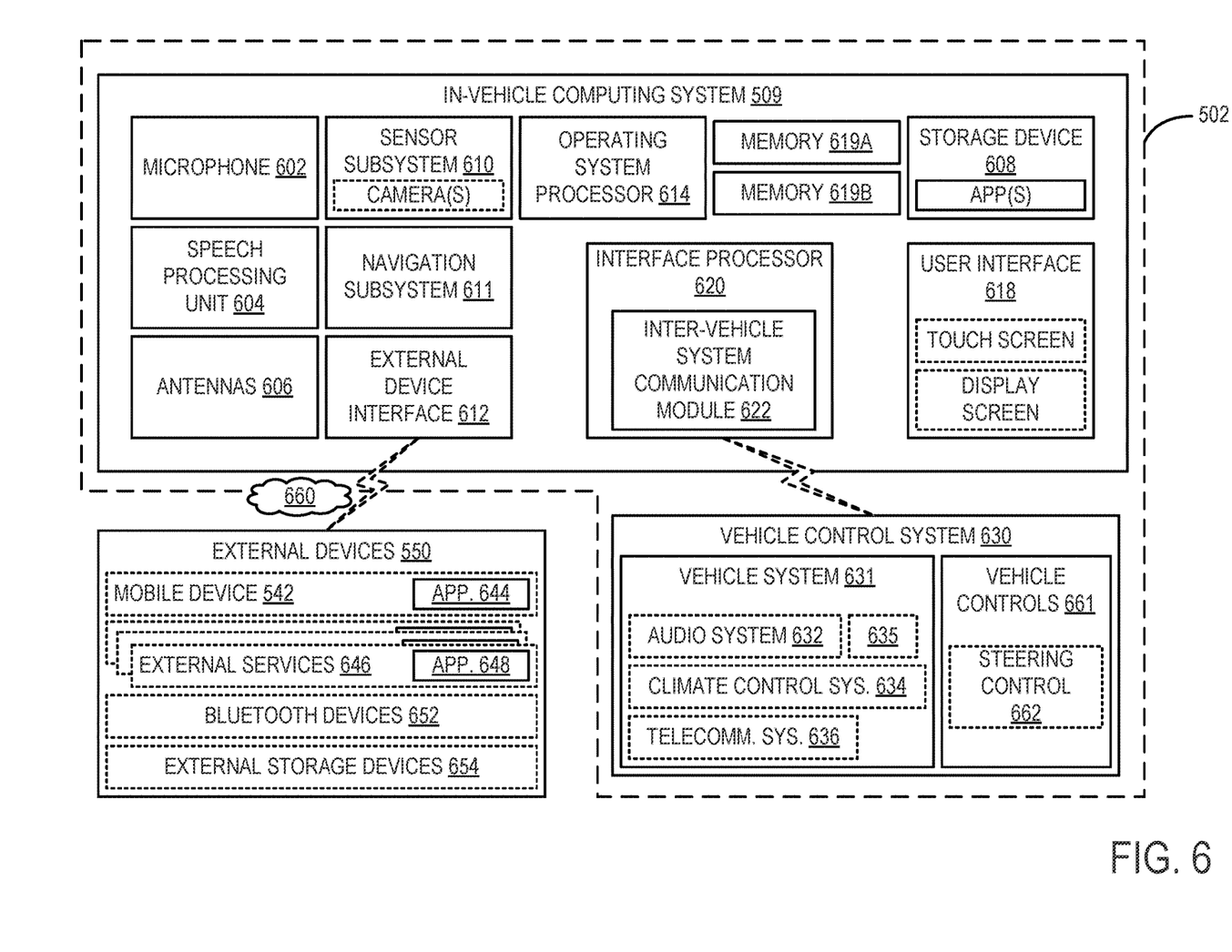
FIG. 6 shows a block diagram of an in-vehicle computing system and/or infotainment system configured and/or integrated inside the vehicle of FIG. 5, with the electronic system for estimating soft error rates and determining countermeasures to achieve a target ASIL level, in accordance with one or more embodiments of the present disclosure.

FIGS. 1A and 1B depict a vehicle with system of image sensors. FIG. 1A depicts the system before an event causing a soft error (e.g., a neutron hit), while FIG. 1B depicts the system after the event. FIGS. 2-4 depict methods for achieving a target ASIL level for a vehicle (e.g., using a system of image sensors as depicted in FIGS. 1A and 1B). FIGS. 5 and 6 depict a vehicle and a vehicle computing system and/or infotainment system, respectively, which incorporate the system of FIGS. 1A and 1B. The disclosed systems and vehicles may be operable to substantially continually estimate neutron flux, then dynamically implement countermeasures among the systems of the vehicle in order to maintain and/or achieve a target ASIL in the presence of the neutron flux.

FIGS. 1A and 1B depict a vehicle 100 with a system 110 including a set of image sensors (e.g., cameras, such as digital cameras). System 110 may include various externally-mounted and/or internally-mounted image sensors, of which various sensors may be outward-facing (e.g., oriented toward an exterior of the vehicle) and various sensor may be inward-facing (e.g., oriented toward an interior of the vehicle). The various image sensors of system 110 may incorporate CMOS based sensor devices and/or CCD based sensor devices (or another photodiode-based image sensor device).

For example, as depicted, system 110 includes various externally-mounted cameras, such as one or more front cameras 112 at a front side of a vehicle, one or more rear cameras 114 at a rear side the vehicle, one or more left-side cameras 116 at a left side of the vehicle, and one or more right-side cameras 118 at a right side of the vehicle. Front cameras 112, rear cameras 114, left-side cameras 116, and/or right-side cameras 118 may be outward-facing cameras (e.g., oriented toward an exterior of vehicle 100), and may form at least part of a 360-degree camera system or surround view camera system that enables and/or facilitates the gathering and/or presentation to a vehicle user of video data around the vehicle. In various embodiments, rear cameras 114 may include one or more backup cameras.

In various embodiments, front cameras 112 may be located on or around a front bumper or grill of vehicle 100, while rear cameras 114 may be located on or around a rear bumper and/or license plate area of vehicle 100. Left-side cameras 116 and right-side cameras 118 may be mounted under or around, respectively, a driver-side side mirror and a passenger-side mirror. However, any other positioning of front cameras 112, rear cameras 114, left-side cameras 116, and right-side cameras 118 with respect to the specific sides of vehicle 100 is contemplated for the systems discussed herein. Moreover, in some embodiments, one or more sides of vehicle 100 may not have a camera mounted thereon, and for some embodiments, a top side and/or a bottom side of vehicle 100 may have one or more cameras mounted thereon.

System 110 is also depicted as including various internally-mounted cameras, such as one or more front-facing cameras 122, one or more front-facing cameras 132, and one or more rear-facing cameras 134. Front-facing cameras 122 may be outward-facing cameras (e.g., oriented toward an exterior of vehicle 100). Front-facing cameras 122 may be mounted in a dashboard area 102 of vehicle 100, and front-facing cameras 122 may accordingly include one or more dashcams in various embodiments.

In contrast, front-facing cameras 132 and rear-facing cameras 134 may be inward-facing cameras (e.g., oriented toward an interior of vehicle 100), and may form part of a system for evaluating driver state and/or passenger state (e.g., awake, drowsy, asleep). Front-facing cameras 132 may be mounted in a rear shelf area 104 of vehicle 100, and rear-facing cameras 134 may be mounted in dashboard area 102 of vehicle 100. Either separately or together, front-facing cameras 132 and rear-facing cameras 134 may accordingly enable and/or facilitate the gathering and/or presentation to a vehicle user of video data within the vehicle, such as video data encompassing dashboard area 102 of vehicle 100, rear shelf area 104 of vehicle 100, and/or one or more seat areas 106 of vehicle 100 (e.g., seat areas 106 for a driver of vehicle 100 and/or one or more passengers in front seats of vehicle 100, and in various vehicles, seat areas 106 for one or more passengers in rear seats of vehicle 100).

In FIGS. 1A and 1B, an image sensor device 150 (e.g., a CMOS based sensor device or a CCD based sensor device) of left-side cameras 116 may have a plurality of pixels at a particular resolution (e.g., at a standard definition (SD) resolution, a high-definition or (HD) resolution, a 4K resolution, or any other resolution). A shutter corresponding with image sensor device 150 (e.g., a mechanical shutter) may be closed, but image sensor device 150 may nevertheless be powered up, activated, controlled, and/or otherwise enabled to capture a frame's worth of sensed values (e.g., to "take a picture"). In various embodiments, the closing of the shutter may happen before, during, or after the activation of image sensor device 150.

While the shutter of the image sensor device 150 is closed and while image sensor device 150 is activated to capture a frame's worth of sensed values, the various image sensors (e.g., pixel-level photodetectors, such as photodiode circuitry attuned to red, green, and/or blue portions of the visible light spectrum) of image sensor device 150 may output some amount of current (e.g., a current flowing through photodetectors of image sensor device 150 in the absence of incident photons), which may be a referred to herein as a "dark current." Accordingly, while the shutter is closed, one or more outputs of image sensor device 150 may be measured (and/or may provide data) to establish a dark current for image sensor device 150. That dark current may represent a system noise due to environmental factors such as temperature.

In various embodiments, one or more image sensors of system 110 may capture the frame's worth of sensed values during the closing of the shutter in place of a frame of image data (e.g., video data) that the image sensors would otherwise capture during normal operation. In other words, one or more image sensors of system 110 may use one frame position in a sequence of captured video frames to close the shutter before capturing the frame (thereby capturing, e.g., a frame of image data due to a dark current). The sensing of such dark current frames may occur at a predetermined frequency, e.g., at a rate of one frame per second.

In some embodiments, for cameras capturing video at a rate of 30 frames per second (FPS) or 60 FPS, the dark current frames captured by image sensor device 150 may accordingly be one of the 30 FPS or 60 FPS that is captured by the associated camera. Alternatively, in other embodiments, the dark current frames captured by image sensor device 150 may be additional frame captured beyond the 30 FSP or 60 FPS image being captured by the associated camera. In such embodiments, the associated camera may accordingly effectively capture 31 FPS or 61 FPS.

Accordingly, in various embodiments, dark current output values of image sensor device 150 may be non-zero values. Alternatively, image sensor device 150 may be configured to accommodate slight non-zero dark current as a baseline level of dark current, and dark current output values of image sensor device 150 may thereafter reflect non-baseline values, e.g., non-zero values that nevertheless correspond with steady-state conditions of image sensor device 150 under existing environmental conditions, such as temperature.

Returning in particular to FIG. 1A, a neutron 190, which may be part of a transient period of significant neutron flux, is on course to hit image sensor device 150. Periods of significant neutron flux may relate to solar activity, such as solar storms, and/or other cosmic events. Neutron flux may be dependent upon geographical location and may be heavily dependent upon altitude. Accordingly, values of neutron flux may vary, such that the value of neutron flux at an altitude of 4000 meters may be more than thirty times higher than the value of neutron flux at sea level.

Turning to FIG. 1B, when neutron 190 hits image sensor device 150, a transfer of energy caused thereby may impact a measured dark current of image sensor device 150 at a region 154, which may encompass a set of one or more photodiodes for one or more pixels. Moreover, the transfer of energy may be of sufficient local magnitude to cause one or more sensors (e.g., color-attuned photodetectors) of one or more pixels of image sensor device 150 to attain not merely relatively low but non-zero dark current values, but relatively high values, such as values for the photodetectors that correspond with white light. Such neutron hits may thus cause "flickering" under which one or more photodetectors of one or more pixels appears to be relatively intensely excited (despite the closed shutter). (Hits from various other high-energy particles may cause a similar type of excitation among the photodetectors of image sensor device 150.)

Accordingly, output of image sensor device 150 corresponding with dark current frames may be a dark current at a level of zero (or substantially the same as a non-zero baseline), or at a significant but small level (or significantly above a non-zero baseline), or at a level reflecting a relatively intense excitation of one or more photodiodes of one or more pixels. Alternatively, upon a neutron hit, image sensor device 150 (and/or a circuitry associated with image sensor device 150) may provide an indication of one or more photodetectors and/or one or more pixels having a level of excitation exceeding a predetermined threshold value, or having a level of excitation corresponding with a maximum excitation level for the photodetectors and/or pixels. That is, image sensor device 150 may provide an indication of "flickering" among the pixels (and/or photodetectors) of image sensor device 150.

Moreover, one or more other image sensing devices of the various image sensors (and associated cameras) of system 110 may operate in a manner substantially similar to image sensor device 150. Accordingly, system 110 may operate in a mode in which some or all of its image sensors are capturing dark current frames as discussed herein. In various embodiments, a set of image sensor devices of system 110 may collectively provide a set of corresponding outputs (e.g., dark current values), and/or a set of indications of the detection of photodetectors excited beyond a predetermined excitation threshold (which may be a relatively high level of excitation, such as half or more of the range of measurable excitation levels for the photodiodes, up to full excitation of the photodiodes).

Thereafter, a soft error rate may be determined based upon the provided outputs and/or indications of sufficiently excited photodetectors. For example, in some embodiments, a dark current value may be used to determine a soft error rate. For some embodiments, a count (e.g., an amount or number) of image sensor devices of system 110 that are sufficiently excited as discussed above, within a certain period of time, may be used to determine a soft error rate, which may in turn reflect a neutron flux value.

In various embodiments, a soft error rate (and/or measurements and data derived from dark current frames) may accordingly be used, along with predetermined hardware failure rates, to estimate a total rate of failures for vehicle 100, which may impact an ASIL rating for vehicle 100. Moreover, for various embodiments, system 110 may use calibration tables prepared for a design or an architecture of system 110 to map from dark current data or measurements of dark current frames, and/or the detection of photodetectors beyond a predetermined excitation threshold of dark current frames, and thereby determine soft error rates. The calibration tables may be established in advance for a system under known conditions, for example, and/or may be extrapolated from known behavior of designs and/or architectures similar to the design and/or architecture of system 110. In various embodiments, such calibration tables may also take into account geographical location and/or altitude.

In addition, once a soft error rate is determined, system 110 and/or vehicle 100 may determine countermeasures that can be taken among various systems of vehicle 100 to address the total error rate (e.g., the predetermined hardware failure rate added to the soft error rate). In some embodiments, the countermeasures may include hardware countermeasures, software countermeasures, or both. For some embodiments, the countermeasures may include activation of advanced error detection and/or error correction algorithms among DRAM of various systems of vehicle 100. System 110 may essentially continuously provide estimates of soft error rates, and performance targets of various systems of vehicle 100 may be temporarily de-prioritized to address a period of sufficiently elevated soft error rates, such as by implementing countermeasures as discussed herein. A period of sufficiently elevated soft error rates may be relatively short, and once the period of sufficiently elevated soft error rates is determined to have ended, performance targets of the various systems of vehicle 100 may be re-prioritized accordingly, and the implemented countermeasures may be discontinued.

Vehicle 100 and/or system 110 may accordingly use image sensors of an existing set of cameras to dynamically and temporarily implement countermeasures in response to periods of sufficiently elevated soft error rates. This may advantageously allow vehicle 100 to achieve a target ASIL level (e.g., ASIL C and/or ASIL D) without permanent implementation of hardware components and/or software components, and without the use of dedicated neutron-flux measurement equipment, both of which may at least be cost-prohibitive and may also be infeasible to implement.

FIGS. 2-4 show methods of using image sensors in an electronic system to estimate soft error rates and determine countermeasures that the system may take to achieve a target ASIL level. FIG. 2 shows a method 200, which may comprise a closing 210, a detecting 220, a determining 230, and an implementing 240. In closing 210, a set of one or more shutters of a set of one or more corresponding image sensors of a system may be repeatedly closed. Each image sensor of the set of one or more image sensors may have a plurality of pixels. In detecting 220, while the set of one or more shutters are closed, one or more photodetectors among the plurality of pixels of at least one image sensor of the set of one or more image sensors that are excited beyond a predetermined excitation threshold may be detected. In determining 230, a soft error rate for the system may be determined based on detecting that one or more photodetectors among the plurality of pixels of at least one image sensor are excited beyond the predetermined excitation threshold. In implementing 240, one or more system countermeasures may be implemented to compensate for the soft error rate.

In some embodiments, the one or more shutters may be mechanical shutters. For some embodiments, the repeated closing of the one or more shutters may be done at a predetermined rate. In various embodiments, the predetermined rate may be at least one image frame per second. For some embodiments, the at least one image frame per second may be in addition to one or more pluralities of base frames per second corresponding with the one or more image sensors, and for some such embodiments, each of the pluralities of base frames per second may be at a predetermined frame rate of either 30 frames per second or 60 frames per second.

For some embodiments, the system countermeasures may be sufficient achieve a target ASIL level, such as ASIL C and/or ASIL D. In various embodiments, the system countermeasures may include hardware countermeasures and/or software countermeasures, and may be directed toward error detection and/or error correction. In various embodiments, the system may be a part of a vehicle.

FIG. 3 shows a method 300, which may comprise a closing 210, a detecting 220, a determining 230, and an implementing 240. In closing 210, a set of one or more shutters of a set of one or more corresponding image sensors of a vehicle may be closed at a predetermined rate. In detecting 220, while the set of shutters are closed, output values of each image sensor of the set of one or more image sensors may be measured. In determining 230, a soft error rate for the vehicle may be determined based on the measurement of the output values. In implementing 240, one or more system countermeasures sufficient to achieve the target ASIL level may be implemented based at least on the soft error rate.

In some embodiments, the one or more shutters may be mechanical shutters. For some embodiments, the predetermined rate may be at least one image frame per second. In some such embodiments, the at least one image frame per second may be in addition to one or more pluralities of base frames per second corresponding with the one or more image sensors, and each of the pluralities of base frames per second may be at a predetermined frame rate of at least 30 frames per second.

For some embodiments, the system countermeasures include hardware countermeasures and/or software countermeasures. In some embodiments, the system countermeasures may include countermeasures directed toward error detection and/or error correction.

FIG. 4 shows a method 400, which may comprise a closing 410, a measuring 420, a determining 430, and an implementing 440. In closing 410, one or more mechanical shutters corresponding with one or more image sensors of a vehicle may be repeatedly closed at a predetermined rate. In measuring 420, while the one or more mechanical shutters are closed, output values for the plurality of pixels of each image sensor may be measured. In determining 430, a soft error rate for the vehicle may be determined based on the measurement of the output values. In implementing 440, one or more countermeasures may be implemented to compensate for the soft error rate for the vehicle. The one or more countermeasures may include hardware countermeasures and/or software countermeasures.

In some embodiments, the one or more countermeasures may be determined to be sufficient to achieve a target ASIL level for the vehicle. For some embodiments, the predetermined rate may be at least one image frame per second. In some embodiments, the at least one image frame per second may be in addition to one or more pluralities of base frames per second corresponding with the one or more image sensors, and each of the pluralities of base frames per second may be at a predetermined frame rate of at least 30 frames per second. For some embodiments, the one or more countermeasures may include countermeasures directed toward error detection and/or error correction.

Method 200, 300, and/or 400 may be performed by operation of the systems disclosed herein (e.g., the vehicular electronic systems, in-vehicle computing systems, and/or infotainment systems disclosed herein). The same advantages that apply to the systems may accordingly apply to the methods.

The description of embodiments has been presented for purposes of illustration. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously.

Note that the example controlling (e.g., closing), measuring, determining, and/or implementing routines included herein can be used with various system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of a computer readable storage medium, where the described actions are carried out by executing the instructions in a system including the various hardware components in combination with the electronic controller.

FIG. 5 shows an example partial view of an interior of a cabin 500 of a vehicle 502, in which a driver and/or one or more passengers may be seated. Vehicle 502 of FIG. 5 may be a motor vehicle including drive wheels (not shown) and an internal combustion engine 504. Internal combustion engine 504 may include one or more combustion chambers which may receive intake air via an intake passage and exhaust combustion gases via an exhaust passage. Vehicle 502 may be a road automobile, among other types of vehicles. In some examples, vehicle 502 may include a hybrid propulsion system including an energy conversion device operable to absorb energy from vehicle motion and/or the engine and convert the absorbed energy to an energy form suitable for storage by an energy storage device. Vehicle 502 may include a fully electric vehicle, incorporating fuel cells, solar energy capturing elements, and/or other energy storage systems for powering the vehicle.

As shown, an instrument panel 506 may include various displays and controls accessible to a human driver (also referred to as the user) of vehicle 502. For example, instrument panel 506 may include a touch screen 508 of an in-vehicle computing system or infotainment system 509 (e.g., an infotainment system), an audio system control panel, and an instrument cluster 510. Touch screen 508 may receive user input to in-vehicle computing system or infotainment system 509 for controlling audio output, visual display output, user preferences, control parameter selection, and so on. While the example system shown in FIG. 5 includes audio system controls that may be performed via a user interface of in-vehicle computing system or infotainment system 509, such as touch screen 508 without a separate audio system control panel, in other embodiments, the vehicle may include an audio system control panel, which may include controls for a conventional vehicle audio system such as a radio, compact disc player, MP3 player, and so on. The audio system controls may include features for controlling one or more aspects of audio output via one or more speakers 512 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system or infotainment system 509 may adjust a radio station selection, a playlist selection, a source of audio input (e.g., from radio or CD or MP3), and so on, based on user input received directly via touch screen 508, or based on data regarding the user (such as a physical state and/or environment of the user) received via one or more external devices 550 and/or a mobile device 528. The audio system of the vehicle may include an amplifier (not shown) coupled to plurality of loudspeakers (not shown). In some embodiments, one or more hardware elements of in-vehicle computing system or infotainment system 509, such as touch screen 508, a display screen 511, various control dials, knobs and buttons, memory, processor(s), and any interface elements (e.g., connectors or ports) may form an integrated head unit that is installed in instrument panel 506 of the vehicle. The head unit may be fixedly or removably attached in instrument panel 506. In additional or alternative embodiments, one or more hardware elements of in-vehicle computing system or infotainment system 509 may be modular and may be installed in multiple locations of the vehicle.

Cabin 500 may include one or more sensors for monitoring the vehicle, the user, and/or the environment. For example, cabin 500 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in cabin 500, and so on. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, and so on. Information regarding ambient conditions of the vehicle, vehicle status, or vehicle driver may also be received from sensors external to/separate from the vehicle (that is, not part of the vehicle system), such as sensors coupled to external devices 550 and/or mobile device 528.

Cabin 500 may also include one or more user objects, such as mobile device 528, that are stored in the vehicle before, during, and/or after travelling. Mobile device 528 may include a smart phone, a tablet, a laptop computer, a portable media player, and/or any suitable mobile computing device. Mobile device 528 may be connected to in-vehicle computing system via a communication link 530. Communication link 530 may be wired (e.g., via Universal Serial Bus (USB), Mobile High-Definition Link (MHL), High-Definition Multimedia Interface (HDMI), Ethernet, and so on) or wireless (e.g., via Bluetooth®, Wi-Fi®, Wi-Fi Direct®, Near-Field Communication (NFC), cellular connectivity, and so on) and configured to provide two-way communication between the mobile device and the in-vehicle computing system. (Bluetooth® is a registered trademark of Bluetooth SIG, Inc., Kirkland, WA. Wi-Fi® and Wi-Fi Direct® are registered trademarks of Wi-Fi Alliance, Austin, Texas.) Mobile device 528 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, communication link 530 may provide sensor and/or control signals from various vehicle systems (such as vehicle audio system, climate control system, and so on) and touch screen 508 to mobile device 528 and may provide control and/or display signals from mobile device 528 to the in-vehicle systems and touch screen 508. Communication link 530 may also provide power to mobile device 528 from an in-vehicle power source in order to charge an internal battery of the mobile device.

In-vehicle computing system or infotainment system 509 may also be communicatively coupled to additional devices operated and/or accessed by the user but located external to vehicle 502, such as one or more external devices 550. In the depicted embodiment, external devices are located outside of vehicle 502 though it will be appreciated that in alternate embodiments, external devices may be located inside cabin 500. The external devices may include a server computing system, personal computing system, portable electronic device, electronic wrist band, electronic head band, portable music player, electronic activity tracking device, pedometer, smart-watch, GPS system, and so on. External devices 550 may be connected to the in-vehicle computing system via a communication link 536 which may be wired or wireless, as discussed with reference to communication link 530, and configured to provide two-way communication between the external devices and the in-vehicle computing system. For example, external devices 550 may include one or more sensors and communication link 536 may transmit sensor output from external devices 550 to in-vehicle computing system or infotainment system 509 and touch screen 508. External devices 550 may also store and/or receive information regarding contextual data, user behavior/preferences, operating rules, and so on and may transmit such information from external devices 550 to in-vehicle computing system or infotainment system 509 and touch screen 508.

In-vehicle computing system or infotainment system 509 may analyze the input received from external devices 550, mobile device 528, and/or other input sources and select settings for various in-vehicle systems (such as climate control system or audio system), provide output via touch screen 508 and/or speakers 512, communicate with mobile device 528 and/or external devices 550, and/or perform other actions based on the assessment. In some embodiments, all or a portion of the assessment may be performed by mobile device 528 and/or external devices 550.

In some embodiments, one or more of external devices 550 may be communicatively coupled to in-vehicle computing system or infotainment system 509 indirectly, via mobile device 528 and/or another of external devices 550. For example, communication link 536 may communicatively couple external devices 550 to mobile device 528 such that output from external devices 550 is relayed to mobile device 528. Data received from external devices 550 may then be aggregated at mobile device 528 with data collected by mobile device 528, the aggregated data then transmitted to in-vehicle computing system or infotainment system 509 and touch screen 508 via communication link 530. Similar data aggregation may occur at a server system and then transmitted to in-vehicle computing system or infotainment system 509 and touch screen 508 via communication link 536 and/or communication link 530.

FIG. 6 shows a block diagram of an in-vehicle computing system or infotainment system 509 configured and/or integrated inside vehicle 502. In-vehicle computing system or infotainment system 509 may perform one or more of the methods described herein in some embodiments. In some examples, in-vehicle computing system or infotainment system 509 may be a vehicle infotainment system configured to provide information-based media content (audio and/or visual media content, including entertainment content, navigational services, and so on) to a vehicle user to enhance the operator's in-vehicle experience. In-vehicle computing system or infotainment system 509 may include, or be coupled to, various vehicle systems, sub-systems, hardware components, as well as software applications and systems that are integrated in, or integratable into, vehicle 502 in order to enhance an in-vehicle experience for a driver and/or a passenger.

In-vehicle computing system or infotainment system 509 may include one or more processors including an operating system processor 614 and an interface processor 620. Operating system processor 614 may execute an operating system on in-vehicle computing system or infotainment system 509, and control input/output, display, playback, and other operations of In-vehicle computing system or infotainment system 509. Interface processor 620 may interface with a vehicle control system 630 via an inter-vehicle system communication module 622.

Inter-vehicle system communication module 622 may output data to one or more other vehicle systems 631 and/or one or more other vehicle control elements 661, while also receiving data input from other vehicle systems 631 and other vehicle control elements 661, e.g., by way of vehicle control system 630. When outputting data, inter-vehicle system communication module 622 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System (GPS) sensors, and so on), digital signals propagated through vehicle data networks (such as an engine controller area network (CAN) bus through which engine related information may be communicated, a climate control CAN bus through which climate control related information may be communicated, and a multimedia data network through which multimedia data is communicated between multimedia components in the vehicle). For example, in-vehicle computing system or infotainment system 509 may retrieve from the engine CAN bus the current speed of the vehicle estimated by the wheel sensors, a power state of the vehicle via a battery and/or power distribution system of the vehicle, an ignition state of the vehicle, and so on. In addition, other interfacing means such as Ethernet may be used as well without departing from the scope of this disclosure.

A storage device 608 may be included in in-vehicle computing system or infotainment system 509 to store data such as instructions executable by operating system processor 614 and/or interface processor 620 in non-volatile form. Storage device 608 may store application data, including prerecorded sounds, to enable in-vehicle computing system or infotainment system 509 to run an application for connecting to a cloud-based server and/or collecting information for transmission to the cloud-based server. The application may retrieve information gathered by vehicle systems/sensors, input devices (e.g., a user interface 618), data stored in one or more storage devices, such as a volatile memory 619A or a non-volatile memory 619B, devices in communication with the in-vehicle computing system (e.g., a mobile device connected via a Bluetooth® link), and so on. (Bluetooth® is a registered trademark of Bluetooth SIG, Inc., Kirkland, WA.) In-vehicle computing system or infotainment system 509 may further include a volatile memory 619A. Volatile memory 619A may be random access memory (RAM). Non-transitory storage devices, such as non-volatile storage device 608 and/or non-volatile memory 619B, may store instructions and/or code that, when executed by a processor (e.g., operating system processor 614 and/or interface processor 620), controls in-vehicle computing system or infotainment system 509 to perform one or more of the actions described in the disclosure.

A microphone 602 may be included in in-vehicle computing system or infotainment system 509 to receive voice commands from a user, to measure ambient noise in the vehicle, to determine whether audio from speakers of the vehicle is tuned in accordance with an acoustic environment of the vehicle, and so on. A speech processing unit 604 may process voice commands, such as the voice commands received from microphone 602. In some embodiments, in-vehicle computing system or infotainment system 509 may also be able to receive voice commands and sample ambient vehicle noise using a microphone included in an audio system 632 of the vehicle.

One or more additional sensors may be included in a sensor subsystem 610 of in-vehicle computing system or infotainment system 509. For example, sensor subsystem 610 may include a camera, such as a rear view camera for assisting a user in parking the vehicle and/or a cabin camera for identifying a user (e.g., using facial recognition and/or user gestures). Sensor subsystem 610 of in-vehicle computing system or infotainment system 509 may communicate with and receive inputs from various vehicle sensors and may further receive user inputs. For example, the inputs received by sensor subsystem 610 may include transmission gear position, transmission clutch position, gas pedal input, brake input, transmission selector position, vehicle speed, engine speed, mass airflow through the engine, ambient temperature, intake air temperature, and so on, as well as inputs from climate control system sensors (such as heat transfer fluid temperature, antifreeze temperature, fan speed, passenger compartment temperature, desired passenger compartment temperature, ambient humidity, and so on), an audio sensor detecting voice commands issued by a user, a fob sensor receiving commands from and optionally tracking the geographic location/proximity of a fob of the vehicle, and so on.

While certain vehicle system sensors may communicate with sensor subsystem 610 alone, other sensors may communicate with both sensor subsystem 610 and vehicle control system 630, or may communicate with sensor subsystem 610 indirectly via vehicle control system 630. A navigation subsystem 611 of in-vehicle computing system or infotainment system 509 may generate and/or receive navigation information such as location information (e.g., via a GPS sensor and/or other sensors from sensor subsystem 610), route guidance, traffic information, point-of-interest (POI) identification, and/or provide other navigational services for the driver.

An external device interface 612 of in-vehicle computing system or infotainment system 509 may be coupleable to and/or communicate with one or more external devices 550 located external to vehicle 502. While the external devices are illustrated as being located external to vehicle 502, it is to be understood that they may be temporarily housed in vehicle 502, such as when the user is operating the external devices while operating vehicle 502. In other words, external devices 550 are not integral to vehicle 502. External devices 550 may include a mobile device 528 (e.g., connected via a Bluetooth®, NFC, WI-FI Direct®, or other wireless connection) or an alternate Bluetooth®-enabled device 652. (Wi-Fi Direct® is a registered trademark of Wi-Fi Alliance, Austin, Texas.)

Mobile device 528 may be a mobile phone, smart phone, wearable devices/sensors that may communicate with the in-vehicle computing system via wired and/or wireless communication, or other portable electronic device(s). Other external devices include one or more external services 646. For example, the external devices may include extra-vehicular devices that are separate from and located externally to the vehicle. Still other external devices include one or more external storage devices 654, such as solid-state drives, pen drives, Universal Serial Bus (USB) drives, and so on. External devices 550 may communicate with in-vehicle computing system or infotainment system 509 either wirelessly or via connectors without departing from the scope of this disclosure. For example, external devices 550 may communicate with in-vehicle computing system or infotainment system 509 through external device interface 612 over a network 660, a USB connection, a direct wired connection, a direct wireless connection, and/or other communication link.

External device interface 612 may provide a communication interface to enable the in-vehicle computing system to communicate with mobile devices associated with contacts of the driver. For example, external device interface 612 may enable phone calls to be established and/or text messages (e.g., Short Message Service (SMS), Multimedia Message Service (MMS), and so on) to be sent (e.g., via a cellular communications network) to a mobile device associated with a contact of the driver. External device interface 612 may additionally or alternatively provide a wireless communication interface to enable the in-vehicle computing system to synchronize data with one or more devices in the vehicle (e.g., the driver's mobile device) via Wi-Fi Direct®, as described in more detail below.

One or more applications 644 may be operable on mobile device 528. As an example, a mobile device application 644 may be operated to aggregate user data regarding interactions of the user with the mobile device. For example, mobile device application 644 may aggregate data regarding music playlists listened to by the user on the mobile device, telephone call logs (including a frequency and duration of telephone calls accepted by the user), positional information including locations frequented by the user and an amount of time spent at each location, and so on. The collected data may be transferred by application 644 to External device interface 612 over network 660. In addition, specific user data requests may be received at mobile device 528 from in-vehicle computing system or infotainment system 509 via external device interface 612. The specific data requests may include requests for determining where the user is geographically located, an ambient noise level and/or music genre at the user's location, an ambient weather condition (temperature, humidity, and so on) at the user's location, and so on. Mobile device application 644 may send control instructions to components (e.g., microphone, amplifier, and so on) or other applications (e.g., navigational applications) of mobile device 528 to enable the requested data to be collected on the mobile device or requested adjustment made to the components. Mobile device application 644 may then relay the collected information back to in-vehicle computing system or infotainment system 509.

Likewise, one or more applications 648 may be operable on external services 646. As an example, external services applications 648 may be operated to aggregate and/or analyze data from multiple data sources. For example, external services applications 648 may aggregate data from one or more social media accounts of the user, data from the in-vehicle computing system (e.g., sensor data, log files, user input, and so on), data from an internet query (e.g., weather data, POI data), and so on. The collected data may be transmitted to another device and/or analyzed by the application to determine a context of the driver, vehicle, and environment and perform an action based on the context (e.g., requesting/sending data to other devices).

Vehicle control system 630 may include controls for controlling aspects of various vehicle systems 631 involved in different in-vehicle functions. These may include, for example, controlling aspects of vehicle audio system 632 for providing audio entertainment to the vehicle occupants, aspects of a climate control system 634 for meeting the cabin cooling or heating needs of the vehicle occupants, as well as aspects of a telecommunication system 636 for enabling g vehicle occupants to establish telecommunication linkage with others.

Audio system 632 may include one or more acoustic reproduction devices including electromagnetic transducers such as one or more speakers 635. Vehicle audio system 632 may be passive or active such as by including a power amplifier. In some examples, in-vehicle computing system or infotainment system 509 may be a sole audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 634 may be configured to provide a comfortable environment within the cabin or passenger compartment of vehicle 502. Climate control system 634 includes components enabling controlled ventilation such as air vents, a heater, an air conditioner, an integrated heater and air-conditioner system, and so on. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 630 may also include controls for adjusting the settings of various vehicle control elements 661 (or vehicle controls, or vehicle system control elements) related to the engine and/or auxiliary elements within a cabin of the vehicle, such as one or more steering wheel controls 662 (e.g., steering wheel-mounted audio system controls, cruise controls, windshield wiper controls, headlight controls, turn signal controls, and so on), instrument panel controls, microphone(s), accelerator/brake/clutch pedals, a gear shift, door/window controls positioned in a driver or passenger door, seat controls, cabin light controls, audio system controls, cabin temperature controls, and so on. Vehicle control elements 661 may also include internal engine and vehicle operation controls (e.g., engine controller module, actuators, valves, and so on) that are configured to receive instructions via the CAN bus of the vehicle to change operation of one or more of the engine, exhaust system, transmission, and/or other vehicle system. The control signals may also control audio output at one or more speakers 635 of vehicle audio system 632. For example, the control signals may adjust audio output characteristics such as volume, equalization, audio image (e.g., the configuration of the audio signals to produce audio output that appears to a user to originate from one or more defined locations), audio distribution among a plurality of speakers, and so on. Likewise, the control signals may control vents, air conditioner, and/or heater of climate control system 634. For example, the control signals may increase delivery of cooled air to a specific section of the cabin.

Control elements positioned on an outside of a vehicle (e.g., controls for a security system) may also be connected to in-vehicle computing system or infotainment system 509, such as via inter-vehicle system communication module 622. The control elements of vehicle control system 630 may be physically and permanently positioned on and/or in the vehicle for receiving user input. In addition to receiving control instructions from in-vehicle computing system or infotainment system 509, vehicle control system 630 may also receive input from one or more external devices 550 operated by the user, such as from mobile device 528. This allows aspects of vehicle systems 631 and vehicle control elements 661 to be controlled based on user input received from external devices 550.

In-vehicle computing system or infotainment system 509 may further include one or more antennas 606. The in-vehicle computing system may obtain broadband wireless internet access via antennas 606, and may further receive broadcast signals such as radio, television, weather, traffic, and the like. In-vehicle computing system or infotainment system 509 may receive positioning signals such as GPS signals via antennas 606. The in-vehicle computing system may also receive wireless commands via radio frequency (RF) such as via antennas 606 or via infrared or other means through appropriate receiving devices. In some embodiments, antenna 606 may be included as part of audio system 632 or telecommunication system 636. Additionally, antenna 606 may provide AM/FM radio signals to external devices 550 (such as to mobile device 528) via external device interface 612.

One or more elements of in-vehicle computing system or infotainment system 509 may be controlled by a user via user interface 618. User interface 618 may include a graphical user interface presented on a touch screen, such as touch screen 508 and/or display screen 511 of FIG. 5, and/or user-actuated buttons, switches, knobs, dials, sliders, and so on. For example, user-actuated elements may include steering wheel controls, door and/or window controls, instrument panel controls, audio system settings, climate control system settings, and the like. A user may also interact with one or more applications of in-vehicle computing system or infotainment system 509 and mobile device 528 via user interface 618. In addition to receiving a user's vehicle setting preferences on user interface 618, vehicle settings selected by in-vehicle control system 630 may be displayed to a user on user interface 618. Notifications and other messages (e.g., received messages), as well as navigational assistance, may be displayed to the user on a display of the user interface. User preferences/information and/or responses to presented messages may be performed via user input to the user interface.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle systems and cloud computing systems described above. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure provides support for a method comprising: repeatedly closing a set of one or more shutters of a set of one or more corresponding image sensors of a system, each image sensor of the set of one or more image sensors having a plurality of pixels, while the set of one or more shutters are closed, detecting one or more photodetectors among the plurality of pixels of at least one image sensor of the set of one or more image sensors that are excited beyond a predetermined excitation threshold, determining a soft error rate for the system based on detecting that one or more photodetectors among the plurality of pixels of at least one image sensor are excited beyond the predetermined excitation threshold, and implementing one or more system countermeasures to compensate for the soft error rate. In a first example of the method, the one or more shutters are mechanical shutters. In a second example of the method, optionally including the first example, repeatedly closing the one or more shutters is done at a predetermined rate. In a third example of the method, optionally including one or both of the first and second examples, the predetermined rate is at least one image frame per second. In a fourth example of the method, optionally including one or more or each of the first through third examples, the at least one image frame per second is in addition to one or more pluralities of base frames per second corresponding with the one or more image sensors. In a fifth example of the method, optionally including one or more or each of the first through fourth examples, each of the pluralities of base frames per second is at a predetermined frame rate selected from one of: 30 frames per second, and 60 frames per second. In a sixth example of the method, optionally including one or more or each of the first through fifth examples, the system countermeasures are sufficient achieve a target ASIL level. In a seventh example of the method, optionally including one or more or each of the first through sixth examples, the system countermeasures include hardware countermeasures, software countermeasures, or both. In an eighth example of the method, optionally including one or more or each of the first through seventh examples, the system countermeasures include countermeasures directed toward error detection, error correction, or both. In a ninth example of the method, optionally including one or more or each of the first through eighth examples, the system is a part of a vehicle.

The disclosure also provides support for a method of achieving a target ASIL level for a vehicle, the method comprising: repeatedly closing a set of one or more shutters of a set of one or more corresponding image sensors of the vehicle at a predetermined rate, while the set of shutters are closed, measuring output values of each image sensor of the set of one or more image sensors, determining a soft error rate for the vehicle based on the measurement of the output values, and implementing one or more system countermeasures sufficient to achieve the target ASIL level based at least on the soft error rate. In a first example of the method, the one or more shutters are mechanical shutters. In a second example of the method, optionally including the first example, the predetermined rate is at least one image frame per second. In a third example of the method, optionally including one or both of the first and second examples, the at least one image frame per second is in addition to one or more pluralities of base frames per second corresponding with the one or more image sensors, and. In a fourth example of the method, optionally including one or more or each of the first through third examples, each of the pluralities of base frames per second is at a predetermined frame rate of at least 30 frames per second. In a fifth example of the method, optionally including one or more or each of the first through fourth examples, the system countermeasures include hardware countermeasures, software countermeasures, or both, and wherein the system countermeasures include countermeasures directed toward error detection, error correction, or both.

The disclosure also provides support for a system for implementing soft-error countermeasures for a vehicle, comprising: one or more image sensors of the vehicle, each image sensor of the one or more image sensors having a plurality of pixels, one or more mechanical shutters corresponding with the one or more image sensors, one or more processors, and a non-transitory memory having executable instructions that, when executed, cause the one or more processors to: repeatedly close the one or more mechanical shutters at a predetermined rate, while the one or more mechanical shutters are closed, measure output values for the plurality of pixels of each image sensor, determine a soft error rate for the vehicle based on the measurement of the output values, and implement one or more countermeasures to compensate for the soft error rate for the vehicle, wherein the one or more countermeasures include hardware countermeasures, software countermeasures, or both. In a first example of the system, the one or more countermeasures are determined to be sufficient to achieve a target ASIL level for the vehicle. In a second example of the system, optionally including the first example, the predetermined rate is at least one image frame per second, wherein the at least one image frame per second is in addition to one or more pluralities of base frames per second corresponding with the one or more image sensors, and wherein each of the pluralities of base frames per second is at a predetermined frame rate of at least 30 frames per second. In a third example of the system, optionally including one or both of the first and second examples, the one or more countermeasures include countermeasures directed toward error detection, error correction, or both.

In this way, electronic systems (including vehicle electronic systems) may maintain and/or achieve a target ASIL in the presence of soft errors, including neutron flux, without recourse to measures (such as permanent error detection and/or error correction, permanent DMR design approaches and/or TMR design approaches, and dedicated neutron detection equipment) which may be cost-prohibitive and/or may exceed other design parameters.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
repeatedly closing a set of one or more shutters of a set of one or more corresponding image sensors of a system, each image sensor of the set of one or more image sensors having a plurality of pixels;
while the set of one or more shutters are closed, detecting one or more photodetectors among the plurality of pixels of at least one image sensor of the set of one or more image sensors that are excited beyond a predetermined excitation threshold;
determining a soft error rate for the system based on detecting that one or more photodetectors among the plurality of pixels of at least one image sensor are excited beyond the predetermined excitation threshold; and
implementing one or more system countermeasures to compensate for the soft error rate.

2. The method of claim 1,
wherein the one or more shutters are mechanical shutters.

3. The method of claim 1,
wherein repeatedly closing the one or more shutters is done at a predetermined rate.

4. The method of claim 3,
wherein the predetermined rate is at least one image frame per second.

5. The method of claim 4,
wherein the at least one image frame per second is in addition to one or more pluralities of base frames per second corresponding with the one or more image sensors.

6. The method of claim 4,
wherein each of the pluralities of base frames per second is at a predetermined frame rate selected from one of: 30 frames per second; and 60 frames per second.

7. The method of claim 1,
wherein the system countermeasures are sufficient achieve a target Automotive Safety Integrity Level (ASIL) level.

8. The method of claim 1,
wherein the system countermeasures include hardware countermeasures, software countermeasures, or both.

9. The method of claim 1,
wherein the system countermeasures include countermeasures directed toward error detection, error correction, or both.

10. The method of claim 1,
wherein the system is a part of a vehicle.

11. A method of achieving a target Automotive Safety Integrity Level (ASIL) level for a vehicle, the method comprising:

repeatedly closing a set of one or more shutters of a set of one or more corresponding image sensors of the vehicle at a predetermined rate;

while the set of shutters are closed, measuring output values of each image sensor of the set of one or more image sensors;

determining a soft error rate for the vehicle based on the measurement of the output values; and implementing one or more system countermeasures sufficient to achieve the target ASIL level based at least on the soft error rate.

12. The method of achieving the target ASIL level for the vehicle of claim 11, wherein the one or more shutters are mechanical shutters.

13. The method of achieving the target ASIL level for the vehicle of claim 11, wherein the predetermined rate is at least one image frame per second.

14. The method of achieving the target ASIL level for the vehicle of claim 13, wherein the at least one image frame per second is in addition to one or more pluralities of base frames per second corresponding with the one or more image sensors.

15. The method of achieving the target ASIL level for the vehicle of claim 14, wherein each of the pluralities of base frames per second is at a predetermined frame rate of at least 30 frames per second.

16. The method of achieving the target ASIL level for the vehicle of claim 11, wherein the system countermeasures include hardware countermeasures, software countermeasures, or both; and wherein the system countermeasures include countermeasures directed toward error detection, error correction, or both.

17. A system for implementing soft-error countermeasures for a vehicle, comprising:

one or more image sensors of the vehicle, each image sensor of the one or more image sensors having a plurality of pixels;

one or more mechanical shutters corresponding with the one or more image sensors;

one or more processors; and a non-transitory memory having executable instructions that, when executed, cause the one or more processors to:

repeatedly close the one or more mechanical shutters at a predetermined rate;

while the one or more mechanical shutters are closed, measure output values for the plurality of pixels of each image sensor;

determine a soft error rate for the vehicle based on the measurement of the output values; and implement one or more countermeasures to compensate for the soft error rate for the vehicle, wherein the one or more countermeasures include hardware countermeasures, software countermeasures, or both.

18. The system for implementing soft-error countermeasures for the vehicle of claim 17, wherein the one or more countermeasures are determined to be sufficient to achieve a target Automotive Safety Integrity Level (ASIL) level for the vehicle.

19. The system for implementing soft-error countermeasures for the vehicle of claim 17, wherein the predetermined rate is at least one image frame per second;

wherein the at least one image frame per second is in addition to one or more pluralities of base frames per second corresponding with the one or more image sensors; and wherein each of the pluralities of base frames per second is at a predetermined frame rate of at least 30 frames per second.

20. The system for implementing soft-error countermeasures for the vehicle of claim 17, wherein the one or more countermeasures include countermeasures directed toward error detection, error correction, or both.

* * * * *